Oct. 9, 1962 W. D. COHEN 3,057,974

INFORMATION SENSING APPARATUS

Filed March 30, 1959 2 Sheets-Sheet 1

INVENTOR.
William D. Cohen

BY

L. C. Yuter

ATTORNEY

INVENTOR.
William D. Cohen
BY
[signature]
ATTORNEY 3,057,974
Patented Oct. 9, 1962

3,057,974
INFORMATION SENSING APPARATUS

William D. Cohen, Syosset, N.Y., assignor to Digitronics Corporation, Albertson, N.Y., a corporation of Delaware Filed Mar. 30, 1959, Ser. No. 803,028
10 Claims. (Cl. 200—46)

This application pertains to sensing indicia recorded on a record medium and more particularly to apparatus for sensing information recorded as holes in a punched record medium.

One of the most widely used mediums for storing or recording information is a punched paper tape. Punched paper tapes are used in control systems, information transfer systems such as Teletype, and as an input means to data processors and computers.

Each character of information is recorded as a coded combination of holes transversely across the tape. The paper tape is longitudinally fed through a reader and a plurality of sensing means in parallel sense for holes along particular channels of the tape so that the characters are serially read. Generally, if a hole is sensed an electrical signal having one characteristic is transmitted to a utilization device, whereas if no hole is sensed either no electrical signal is transmitted or an electrical signal having a different characteristic is transmitted to the utilization device.

Most low-speed paper tape readers employ sensing devices which are operated by pushing a sensing pin against the paper tape. The sensing pin passes through the paper tape if a hole is present permitting the closing of a contact to cause the completion of an electrical circuit. However, if no hole is present the sensing pin is stopped by the paper tape and no circuit closure is effected.

Such a sensing means because it comes in contact with the paper tape creates several problems. There is often a jamming of the paper tape in the guiding means about the sensing pins. Furthermore, the paper tape is often torn or damaged by the sensing pins as they pass through the holes. In addition, although in many applications the paper tape is only used once, there are certain applications particularly associated with data processors and computers wherein the paper tape is repeatedly used to enter complicated control procedures. Since the pushing of the sensing pins against the paper tape and their penetration through the holes causes wear, it is necessary to repunch a new paper tape after a number of readings. Also, in many of the sensing pin devices it is only possible to move the paper tape in one direction.

Although there are presently available sensing devices such as photo-electric readers which do not require any physical contact with the paper tape, these devices are very expensive and require critical adjustments.

Similar problems exist in connection with sensing indicia in other record mediums such as punched cards.

It is accordingly an object of the invention to provide improved apparatus for sensing indicia in a record medium.

It is another object of the invention to provide improved apparatus for sensing holes in a punched record medium which employs elements that do not come in physical contact with the punched record medium.

It is a further object of the invention to provide an improved sensing means for sensing the holes in a punched record medium which, while on the one hand being extremely reliable, is, on the other hand, relatively inexpensive.

Briefly, in accordance with a preferred embodiment of the invention, apparatus is provided for sensing holes in a punched record medium. The apparatus includes a chamber having a port operatively disposed with respect to the punched record medium. A reciprocatingly driven piston is positioned within the chamber to periodically change the volume of air enclosed by the chamber. If a hole is present in the portion of the punched record medium opposite the port, there will be no change in the air pressure within the chamber. However, if there is no hole present in the portion of the record medium opposite the port in the chamber, there will be a change in the air pressure. Signal generating means are further provided which are responsive to the air pressure in the chamber for indicating the presence or absence of holes in the punched record medium.

In a particularly valuable embodiment of the invention for use with a punched record medium having closely spaced holes, the port of each chamber is operatively disposed with respect to the punched record medium by means of a tube extending the port of each chamber to the punched record medium.

An advantage of the invention is that the punched record medium may be sensed while moving forwards and backwards.

Other objects, features and advantages of the invention will be apparent from the following detailed description when read with the accompanying drawings wherein.

Figures 1, 2, 3, 4:
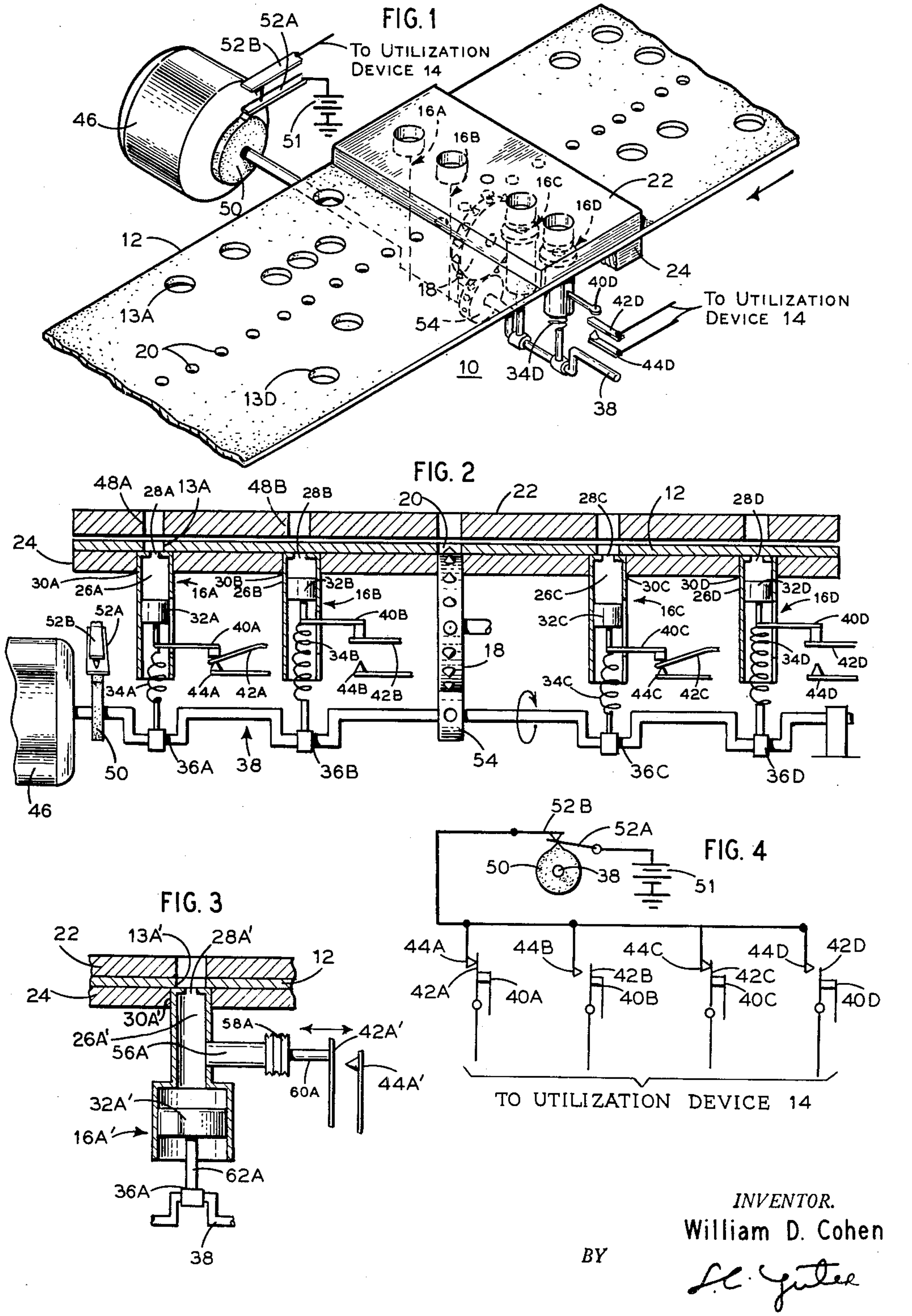
FIGURE 1 is a perspective view of apparatus for sensing the presence of holes in a punched record medium in accordance with a preferred embodiment of the invention for use when the holes are spaced widely enough to position the ports of the chambers adjacent the punched record medium.
FIGURE 2 is a sectional view of the apparatus of FIGURE 1 taken along the lines 2—2.
FIGURE 3 is a sectional view of an alternate embodiment of one of the sensing means of FIGURE 1.
FIGURE 4 is a schematic diagram of the electrical circuitry associated with the apparatus of FIGURE 1.

Referring to FIGURES 1 and 2, a punched paper tape reader 10 is shown for reading information holes 13 in a punched paper tape 12 and for feeding electrical signals to a utilization device 14 in accordance with the information holes 13*a* sensed by the punched paper tape reader 10. Each character of information is represented by a coded combination of information holes 13 disposed at predetermined positions along transverse lines of the paper tape 12. These predetermined positions are the same for each transverse line and accordingly define channels for the paper tape 12.

The number of channels on any paper tape is determined by the overall system for which it is employed. For example, Teletype systems usually employ five channels whereas some computer systems employ as many as eight channels on the paper tape 12. As herein shown, solely for example, four channel paper tape will be employed.

Accordingly, the punched paper tape reader 10 includes four hole sensing elements, 16*a* to 16*d*, a sprocket wheel 18 which engages sprocket holes 20 feeds the paper tape 12 between a pressure pad or guide plate 22 and a platen 24. The feed may be intermittent so that each transverse row of information holes 13 is sensed before the paper tape 12 is stepped to the next row.

Referring more particularly to FIGURE 2, a representative sensing element 16*a* will be more completely described. The sensing element 16*a* includes a chamber 26*a* having a port 28*a* fitted in a platen hole 30*a*. A spring 34*a* connects the piston 32*a* to the crank pin 36*a* of crankshaft 38. Spring 34*a* is stiff enough to impart reciprocating motion to the piston 32*a* while following the eccentric motion of crank pin 36*a* when crankshaft 38 rotates, provided no opposing forces are exerted on piston 32*a*. However, if opposing forces are exerted on piston 32*a* because of differences in air pressure in the chamber 26*a*, as is hereinafter more fully described, the spring 34*a* is sufficiently compressible to accommodate these opposing forces. Extending from piston 32*a* is an actuator 40*a* for moving contact 42*a* against a fixed contact 44*a*. It should be noted that actuator 40*a* is insulated from moving contact 42*a*.

During operation, a motor 46 rotates crankshaft 38 causing crank pin 36*a* to impart reciprocating motion to piston 32*a* via spring 34*a*. If an information hole such as the information hole 13*a* is opposite the port 28*a* of chamber 26*a*, the air pressure therein will not change since there is continuous access to the ambient atmosphere via the port 28*a*, the information hole 13*a*, and the pressure pad or guide plate hole 48*a*. Therefore, on the upstroke the piston 32*a* attains its maximum travel. Similarly, on the downstroke the piston 32*a* will travel its maximum downward distance. The moving contact 42*a* and the fixed contact 44*a*, which are in a normally open arrangement, are disposed so that the actuator 40*a* closes the circuit when the piston 32*a* is close to its maximum downward excursion.

However, if an information hole 13 is not present in the paper tape 12, a different phenomenon occurs. In particular, it is seen that there is no information hole 13 opposite the port 28*b* of the sensing element 16*b*. Therefore, on the upstroke of piston 32*b* the air pressure in the chamber 26*b* builds up and there is an opposing force on the piston 32*b* thus restricting its upward travel. Similarly, on the downstroke the paper tape 12 is sucked against the port 28*b* and a partial vacuum is created in the chamber 26*b* limiting the downward travel of the piston 32*b*. This restriction in downward travel prevents the actuator 40*b* from urging the moving contact 42*b* against the fixed contact 44*b* and no circuit is closed between these two contacts.

Thus, by connecting the moving contacts 42*a* to 42*d* to a source of potential, it is possible to sense the presence or absence of holes in the punched paper tape 12 by sampling the contacts 44*a* to 44*d* for electrical signals.

It should be noted that the orientation of the actuators 40*a* to 40*d* with respect to the moving contacts 42*a* to 42*d* and the fixed contacts 44*a* to 44*d* permits the sensing to occur on the downstroke of the pistons 32*a* to 32*d*. Such an arrangement is highly desirable when employing chadless paper tape as well as conventional paper tape. However, it should be noted that the orientation of these elements may be modified to permit the sensing to occur on the upstroke of the pistons 32*a* to 32*d*.

Although it is possible to continuously apply a potential to the moving contacts 42*a* to 42*d*, it is more desirable to apply this potential only during the particular portion of the cycle of rotation of the crankshaft 38 when the information holes 13 are actually being sensed. For example, as shown in FIGURE 2, this application of voltage should be when the pistons 32*a* to 32*d* are close to the end of their downward travel.

Accordingly, a cam 50 is coupled to the crankshaft 38 to operate a cam switch 52. Thus, when the pistons 32*a* to 32*d* approach the end of their downward motion, the cam 50 causes the moving contact 52*a* to engage the fixed contact 52*b* closing a circuit from a source of potential 51 (FIG. 4) to the moving contacts 40*a* to 40*d*.

To step the paper tape 12 to the next position, a sprocket wheel 18 (FIGS. 1 and 2) engages sprocket holes 20 in the paper tape 12. The sprocket wheel 18 is driven by a gear 54 coupled to the crankshaft 38. For intermittent motion the gear 54 may be provided with a single tooth which is so positioned to step the sprocket wheel 18 one notch for each revolution of the crankshaft 38.

FIGURE 3 shows a sensing element 16*a'* which is an alternate embodiment of the sensing element 16*a* of FIGURE 2. Since the sensing element 16*a'* of FIGURE 3 is similar in many respect to the sensing element 16*a* of FIGURE 2, prime reference characters are employed for corresponding elements and only the differences will be discussed in detail.

In particular, a port 56*a* pneumatically connects the chamber 16*a* to a bellows 58*a*. The bellows 58*a* is mechanically connected via an arm 60*a* to the moving contact 42*a'*. Also, the coupling of the piston 32*a'* to the crank pin 36*a* is by a connecting rod 62*a* which is rigid. Thus, as crankshaft 38 rotates, reciprocating motion is imparted to the piston 32*a'*. As long as a hole such as the information hole 13*a'* in the paper tape 12 is opposite the port 28*a'*, the bellows 58*a* remains in its normal state. However, if the paper tape 12 completely masks the port 28*a'*, there will be an expansion of the bellows 58*a* during the upstroke of the piston 32*a'*. This expansion causes the arm 60*a* to position the moving contact 42*a'* against the fixed contact 44*a'*. Thus, the sensing element 16*a'* can give an indication of the presence or absence of a hole in the paper tape 12.

As shown in FIGURE 3, the moving contact 42*a'* is positioned against the fixed contact 44*a'* whenever there is no hole in the portion of the paper tape 12 opposite the port 28*a'*. It should be noted, however, that by re-orienting the contacts 42*a'* and 44*a'* by a rotation of one hundred and eighty degrees it is possible to obtain a similar indication during the downstroke of the piston 32*a'*.

It should be noted that although the ports 28*a* to 28*d* of FIGURE 2 and the ports 28*a'* to 28*d'* (not shown) of FIGURE 3 are positioned directly opposite the platen holes 30*a'* to 30*d'* (not shown) it is often desirable, particularly when the space between channels is limited, to locate the chambers 26*a* to 26*d* and 26*a'* to 26*d'* (not shown) at a position remote from the platen 24 and to provide pneumatic tubing for the connections. In such a case the pneumatic tubing acts as part of the chambers.

Figure 5:
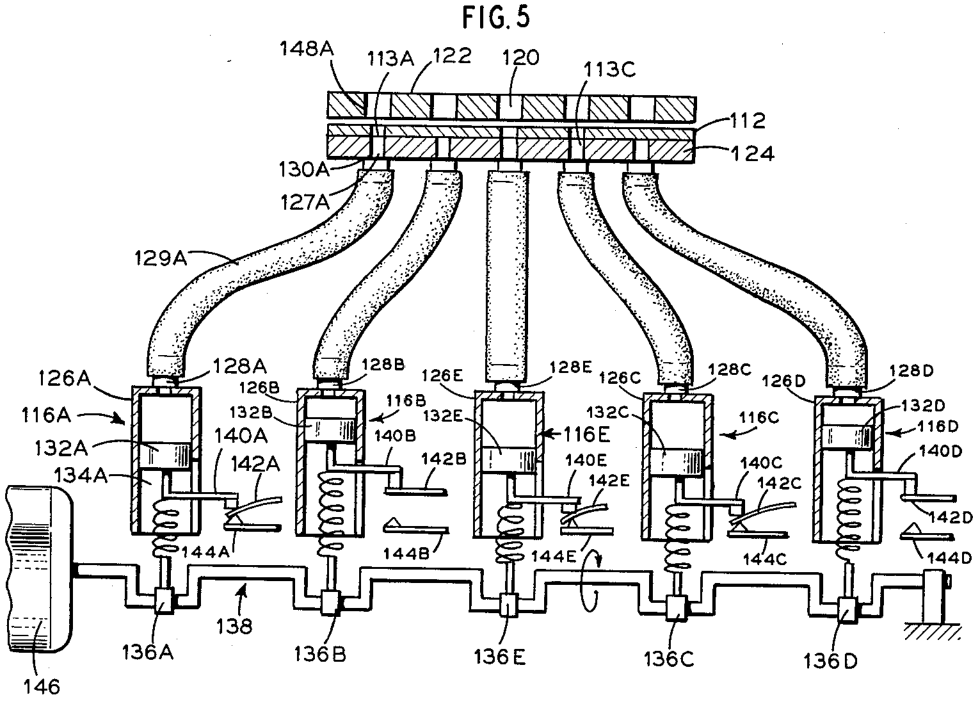
FIGURE 5 is a sectional view of another alternative embodiment of the invention which is particularly adaptable to sensing information in a punched record medium where the holes are closely spaced.

Accordingly, FIGURE 5 shows an embodiment of the invention which is preferred for handling punched record mediums having minimal spacing between channels. Since the embodiment of FIGURE 5 is in many ways similar to the embodiment of FIGURE 2, like elements have reference characters increased by 100 and only the differences will be discussed in detail.

In particular, a typical sensing element 116*a* includes a chamber 126*a* having a port 128*a* coupled to one end of a pneumatic conduit or tubing 129*a*. The other end of tubing 129*a* is connected via a coupling means 127*a* to a platen hole 130*a* which now becomes the operative port for the chamber. It is therefore possible to position the sensing elements 116*a* to 116*d* at a point removed from the record medium 112 and therefore the chambers 126*a* to 126*d* may be of greater volume to maximize pressure differentials for enhancing the operation of the sensing elements 116*a* and 116*d*.

Another difference in this embodiment is concerned with the use of the sprocket holes 120. In the embodiments of FIGURES 1–3, the sprocket holes 20 are engaged by a sprocket wheel 18 to cause the movement of the record medium 12. However, in the embodiment of FIGURE 5 the record medium 112 is moved by a friction drive employing conventional capstans (not shown). The sprocket holes 120 are instead used to control the sampling time of the information holes 113.

In particular, a sensing element 116*e* identical to the sensing elements 116*a* to 116*d* senses the sprocket holes 120. Since there is a sprocket hole for each row of information holes, the sensing of this sprocket hole can control the time for sampling the information holes in its associated row.

Figure 6:
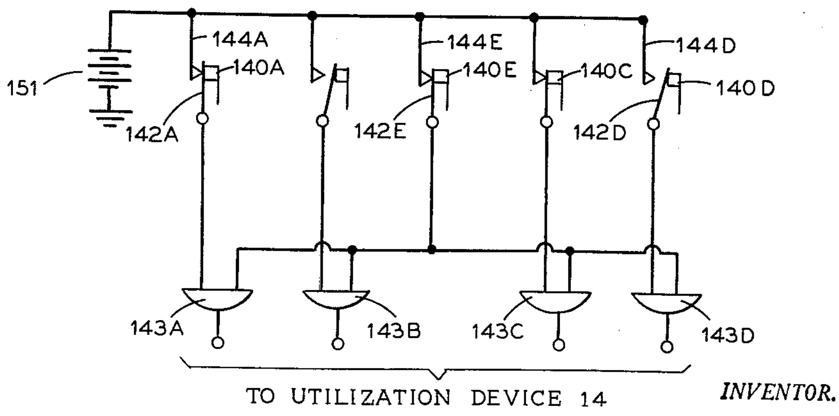
FIGURE 6 is a schematic diagram of electrical circuitry for use with the apparatus of FIGURE 5.

More specifically, the occurrence of the sprocket hole 120 can be used to test the state of the contacts 142*a* to 142*d*. Accordingly, FIGURE 6 shows one possible sampling scheme. Each of the moving contacts 142*a* to 142*d* is connected to one input of respective "and" gates 143*a* to 143*d* while the moving contact 142*e* of the sensing element 116*e* associated with the sprocket holes 120 is coupled in parallel to each of the other inputs of the "and" gates 143*a* to 143*d*. Each of these "and" gates 143*a* to 143*d* has the property of passing a positive signal when both of its input terminals are receiving a positive signal. Since each of the fixed contacts 144*a* to 144*e* is connected to the source of positive potential 151, a positive potential will be present on the moving contacts 142*a* to 142*e* whenever the associated actuators 140*a* to 140*e* force the moving contacts 142*a* to 142*e* against the fixed contacts 140*a* to 140*e*.

Thus, as shown in FIGURE 6, the actuators 140*a* and 140*c* have moved indicating that holes 113*a* and 113*c* are present in record medium 112 of FIGURE 5. At the same time the actuator 140*e* has moved indicating the sensing of a sprocket hole 120. Therefore the "and" gates 143*a* and 143*c* pass positive signals to the utilization device 14.

It has been found with representative embodiments of the invention that twenty characters per second are easily read with the crankshaft 38 rotating at 1200 revolutions per minute and the paper tape 12 moving at two inches per second.

There has thus been shown improved means for sensing holes in a punched record medium. These means are extremely reliable and inexpensive because they employ simple and rugged elements. Furthermore, the apparatus permits the repeated use of punched paper tapes since it does not depend upon contact with the paper tape to sense the presence of holes therein.

There will now be obvious to those skilled in the art many modifications and variations satisfying the objects and realizing many or all of the advantages but which do not depart from the spirit of the invention as defined in the claims which follow.

What is claimed is:

1. Apparatus for sensing holes in a punched record medium comprising a chamber, means comprising a port in communication with said chamber and disposed opposite the punched record medium, a piston disposed in said chamber, drive means for reciprocating said piston, elastic means for coupling said drive means to said piston, said elastic means being sufficiently compressible in response to an increase in air pressure on the piston in said chamber when said port is blocked by the record medium to thereby limit the extent of travel of the piston during a compression stroke, said elastic means being sufficiently extensible to enable the return travel of the piston to be restricted due to the partial vacuum created in the chamber at such time, so that the distance of travel of said piston in each direction is dependent on the air pressure in said chamber, and switch means responsive to the travel of said piston for indicating the presence of a hole in the portion of the punched record medium opposite said port.

2. Apparatus for sensing holes in a punched record medium comprising a chamber, means comprising a port in communication with said chamber and disposed opposite the punched record medium, a piston disposed in said chamber, drive means for reciprocating said piston, elastic means coupling said drive means to the piston, said elastic means being sufficiently compressible in response to an increase in air pressure on the piston in said chamber when said port is blocked by the record medium to thereby limit the extent of travel of the piston during a compression stroke, said elastic means being sufficiently extensible to enable the return travel of the piston be be restricted due to the partial vacuum created in the chamber at such time, so that the distance of travel of said piston in each direction is dependent on the air pressure in said chamber, switching means, and actuating means associated with said piston for actuating said switching means when said piston travels beyond a predetermined distance to indicate the presence of a hole in the portion of the record medium opposite said port.

3. Apparatus for sensing holes in a punched record medium comprising a chamber, means comprising a port in communication with said chamber and disposed opposite the punched record medium, a piston disposed in said chamber, drive means for reciprocating said piston, a coil spring coupling the motion of said drive means to said piston for causing the distance of travel of said piston in each direction to be dependent on the air pressure in said chamber, switching means, and actuating means associated with said piston for actuating said switching means when said piston travels beyond a predetermined distance to indicate the presence of a hole in the portion of the punched record medium opposite said port.

4. Apparatus for sensing a punched record medium comprising a chamber, a first port in said chamber disposed opposite the punched record medium, a piston, means for reciprocatingly driving said piston for increasing the pressure in said chamber between said piston and said first port when said first port is blocked by said punched record medium, a second port disposed in said chamber at a point beyond the maximum travel of said piston, and a pressure sensitive switching means coupled to said second port for indicating the absence of a hole in the portion of the punched record medium opposite said port.

5. Apparatus for sensing holes in a punched record medium comprising a chamber, a first port in said chamber disposed opposite the punched record medium, a piston, means for reciprocatingly driving said piston for changing the volume between said piston and said first port, a second port disposed in said chamber at a point beyond the maximum travel of said piston, a pressure sensitive actuator coupled to said second port and operative when a change in said volume produces a change in pressure in said chamber, and a switching means responsive to said pressure sensitive actuator.

6. Apparatus for sensing a punched record medium comprising a chamber, a first port disposed in said chamber opposite the punched record medium, a piston disposed in said chamber, means for reciprocatingly driving said piston for increasing the pressure in said chamber between said piston and said first port when said first port is blocked by said punched record medium, a second port disposed at a point in said chamber beyond the maximum travel of said piston, a bellows means coupled to said second port, said bellows means expanding when said pressure increases and a switch means responsive to said bellows means.

7. Apparatus for a punched record medium comprising a chamber, a first port disposed in said chamber opposite the punched record medium, a piston disposed in said chamber for changing the pressure in said chamber between said piston and said first port when said punch record medium blocks said first port, a rotatable drive means, a source of rotary power for rotating said drive means, means coupling said drive means to said piston for imparting reciprocating motion to said piston, a second port disposed at a point in said chamber beyond the maximum travel of said piston, a pressure sensitive actuator coupled to said second port for sensing changes in said pressure, a switching means responsive to said pressure sensitive actuator for indicating the absence of a hole in the portion of the punched record medium opposite said first port, and means coupled to said eccentric drive means for energizing said switching means only during a particular portion of each cycle of rotation of said eccentric drive means.

8. Apparatus for sensing holes in a punched record medium comprising a chamber remote from the punched record medium, a port in said chamber, a pneumatic conduit having one end coupled to said port and the other end disposed opposite the punched record medium, a piston disposed in said chamber, drive means for reciprocating said piston, elastic means for coupling said drive means to said piston, said elastic means being sufficiently compressible in response to an increase in air pressure on the piston in said chamber when said other end of the conduit is blocked by the record medium to thereby limit the extent of travel of the piston during a compression stroke, said elastic means being sufficiently expansible to enable the return travel of the piston to be restricted due to the partial vacuum created in the chamber at such time, so that the distance of travel of said piston in each direction is dependent on the air pressure in said chamber and said pneumatic conduit, and switch means responsive to the travel of said piston for indicating the presence of a hole in the portion of the record medium opposite said other end of the pneumatic conduit.

9. Apparatus for sensing holes in a punched record medium comprising a chamber remote from said record medium, a port in said chamber, a pneumatic conduit having one end coupled to said port and the other end disposed opposite the punched record medium, a piston disposed in said chamber, drive means for reciprocating said piston, elastic means coupling said drive means to said piston, said elastic means being sufficiently compressible in response to an increase in air pressure on the piston in said chamber when said other end of the conduit is blocked by the record medium to thereby limit the extent of travel of the piston during a compression stroke, said elastic means being sufficiently expansible to enable the return travel of the piston to be restricted due to the partial vacuum created in the chamber at such time, so that the distance of travel of said piston in each direction is dependent on the air pressure in said chamber and said pneumatic conduit, switching means, and actuating means associated with said piston for actuating said switching means when said piston travels beyond a predetermined distance to indicate the presence of a hole in the portion of the record medium opposite said other end of the pneumatic conduit.

10. Apparatus for sensing holes in a punched record medium comprising a chamber remote from said record medium, a port disposed in said chamber, a tubing means having one end coupled to said port and the other end opposite the punched record medium, a piston disposed in said chamber, drive means for reciprocating said piston, a coil spring coupling the motion of said drive means to said piston for causing the distance of travel of said piston in each direction to be dependent on the air pressure in said chamber and said tubing means, switching means, and actuating means associated with said piston for actuating said switching means when said piston travels beyond a predetermined distance to indicate the presence of a hole in the portion of the punched record medium opposite said other end of the tubing means.

References Cited in the file of this patent

UNITED STATES PATENTS

| | | |
|---|---|---|
| 1,379,654 | Sommermeyer | May 31, 1921 |
| 1,911,259 | Bergoin | May 30, 1933 |
| 2,824,182 | Lambert | Feb. 18, 1958 |

UNITED STATES PATENT OFFICE

CERTIFICATE OF CORRECTION

Patent No. 3,057,974 October 9, 1962

William D. Cohen

It is hereby certified that error appears in the above numbered patent requiring correction and that the said Letters Patent should read as corrected below.

Column 2, line 33, strike out "taken along the lines 2-2"; line 63, for "16d, a" read -- 16d. A --; column 6, line 63, for "punch" read -- punched --; same column 6, line 74, and column 7, line 2, strike out "eccentric", each occurrence.

Signed and sealed this 8th day of October 1963.

(SEAL)
Attest:

RNEST W. SWIDER
ttesting Officer

EDWIN L. REYNOLDS
Acting Commissioner of Patents